(12) United States Patent
Howitt (10) Patent No.: US 8,220,484 B2
(45) Date of Patent: Jul. 17, 2012

(54) MONITORING SYSTEMS AND METHODS FOR SEWER AND OTHER CONDUIT SYSTEMS

(75) Inventor: Ivan Howitt, Charlotte, NC (US)

(73) Assignee: University of North Carolina at Charlotte, Charlotte, NC (US)

(*) Notice: Subject to any disclaimer, the term of this patent is extended or adjusted under 35 U.S.C. 154(b) by 412 days.

(21) Appl. No.: 12/399,492

(22) Filed: Mar. 6, 2009

(65) Prior Publication Data

US 2009/0250125 A1    Oct. 8, 2009

Related U.S. Application Data

(60) Provisional application No. 61/041,725, filed on Apr. 2, 2008.

(51) Int. Cl.
*E03B 7/07* (2006.01)
(52) U.S. Cl. .......................... 137/551; 340/603; 340/605
(58) Field of Classification Search .................. 340/605, 340/603; 137/551
See application file for complete search history.

(56) References Cited

U.S. PATENT DOCUMENTS

| | | | | |
|---|---|---|---|---|
| 3,721,898 | A * | 3/1973 | Dragoumis et al. | 340/605 |
| 4,361,030 | A * | 11/1982 | Heide | 73/40.5 R |
| 5,708,195 | A * | 1/1998 | Kurisu et al. | 340/605 |
| 6,155,292 | A * | 12/2000 | Kurata | 137/552 |
| 6,672,131 | B1 * | 1/2004 | Aldal et al. | 73/1.83 |
| 6,848,313 | B2 * | 2/2005 | Krieg et al. | 73/628 |
| 2003/0033879 | A1 * | 2/2003 | Adewumi et al. | 73/627 |
| 2005/0145018 | A1 | 7/2005 | Sabata et al. | |
| 2007/0041333 | A1 | 2/2007 | Twitchell, Jr. | |
| 2007/0103324 | A1 * | 5/2007 | Kosuge et al. | 340/618 |
| 2008/0155064 | A1 | 6/2008 | Kosuge et al. | |

FOREIGN PATENT DOCUMENTS

EP    0942274 A2    9/1999

(Continued)

OTHER PUBLICATIONS

G. Manic, R. Bernardin, C. Salic, F. Blanchet, and M. Zug; "On-Line Survey and Diagnose of Sewer Networks"; Water Practice & Technology, vol. 2, No. 2 (C) IWA Publishing 2007 doi: 10.2166/WPT2007033.

(Continued)

*Primary Examiner* — Eric M Blount
(74) *Attorney, Agent, or Firm* — Clements Bernard PLLC; Christopher L. Bernard; Lawrence A. Baratta, Jr.

(57) ABSTRACT

The present invention provides a monitoring system for a conduit network including one or more conduit sections joined at one or more conduit nodes, including: one or more sensor devices disposed at selected ones of the one or more conduit nodes, wherein each of the one or more sensor devices is operable for sensing a blockage or breakage in an associated conduit section, and wherein each of the one or more sensor devices is operable for communicating blockage or breakage information to a central location. Optionally, each of the sensor devices includes one of an audio sensor device and a radio frequency sensor device. Each of the sensor devices is operable for sensing the blockage or breakage in the associated conduit section by measuring an attribute of a transmitted/received signal, alone or in combination with another sensor device. Each of the sensor devices is operable for communicating the blockage or breakage information to the central location via a wireless link.

20 Claims, 9 Drawing Sheets

FOREIGN PATENT DOCUMENTS

| | | |
|---|---|---|
| WO | WO0046545 A1 | 8/2000 |
| WO | WO2007046705 A1 | 4/2007 |

OTHER PUBLICATIONS

Timothy P. Ruggaber, M. Asce, and Jeffrey W. Talley; "Detection and Control of Combined Sewer Overflow Events Using Embedded Sensor Network Technology"; Copyright ASCE 2005.

www.hach.com; Open-Channel flow Meters—Innovative Technology for a Wide Range of Applications; Hach Company World Headquarters, Loveland, Colorado. (C) Hach Company 2005, All rights reserved.

North Carolina Libraries for Virtual Education (NCLIVE) InfoTrac Onefile; Water and Waste Water International, Sep. 2003 v18 i6 p17(1). Article A109026421—Dec. 8, 2005 10:20 PM.

F.J. Podd, M.T.B. Ali, K.V. Horoshenkov, A.S. Wood, S.J. Tait, J.C. Boot, R. Long, and A.J. Saul; Rapid Sonic Characterisation of Sewer Change and Obstructions; Document from the British Library; www/bl.uk; Aug. 2007.

HACH Company, 2003. "Sigma 1000: Wireless remote monitoring from your office"; All rights reserved. Dusseldorf Germany.

* cited by examiner

MONITORING SYSTEMS AND METHODS FOR SEWER AND OTHER CONDUIT SYSTEMS

CROSS-REFERENCE TO RELATED APPLICATION(S)

The present non-provisional patent application claims the benefit of priority of U.S. Provisional Patent Application No. 61/041,725, filed on Apr. 2, 2008, and entitled "SEWER SYSTEM OVERFLOW (SSO) DETECTION NETWORK," the contents of which are incorporated in full by reference herein.

FIELD OF THE INVENTION

The present invention relates generally to monitoring systems and methods for sewer and other conduit systems. More specifically, the present invention relates to a network of sensors operable for predicting and detecting blockages and breakages in a sewer system, other fluid delivery system, or other gas delivery system, such that preventative and emergency maintenance may be performed with an efficient deployment of resources and major damages and losses may be prevented. This network of sensors utilizes audio and/or radio frequency (RF) signals.

BACKGROUND OF THE INVENTION

Over 34-thousand sewer overflows occur annually within the United States, resulting in the spillage of in excess of 850-billion gallons of untreated wastewater. In Charlotte, N.C., for example, over 400 sanitary sewer overflows (SSOs) occurred in 2007 within the Charlotte-Mecklenburg Utilities (CMU) service area, resulting in the spillage of in excess of 1.6-million gallons of untreated wastewater. Such sewer overflows are predominantly caused by blockages. These blockages cause the untreated wastewater to spill out of manholes onto streets, into public and private property, and into waterways. The results are property damage, environmental problems, and, in the most severe cases, public health and safety hazards. The complexity and dynamic nature of the sewer system presents significant maintenance challenges. Underlying maintenance policy development is an engineering tradeoff: over-maintenance results in an inefficient deployment of resources and unnecessary cost and under-maintenance results in a greater overflow risk. Thus, there is a need in this industry and others for reliable and cost effective systems and methods to predict and detect blockages and breakages in a sewer system, other fluid delivery system, or other gas delivery system, such that preventative and emergency maintenance may be performed with an efficient deployment of resources and major damages and losses may be prevented.

BRIEF SUMMARY OF THE INVENTION

In various exemplary embodiments, the present invention provides monitoring systems and methods for sewer and other conduit systems. These monitoring systems and methods allow wastewater utilities and the like to implement dynamic predictive maintenance systems (DPMSs) and institute just-in-time maintenance programs for mitigating combined sewer overflows (CSOs), involving both wastewater and storm water, and SSOs, involving only wastewater. For example, the monitoring systems and methods allow for the detection of blockages in low flow pipes due to grease clogs, root balls, and the like, as well as breakages. Maintenance efforts may then be directed to areas where problems are the most likely, as well as where they already exist. It will be readily apparent to those of ordinary skill in the art, that although many of the examples provided herein involve sewer systems, the monitoring systems and methods of the present invention are applicable to any conduit systems, such as oil delivery systems, other fluid delivery systems, gas delivery systems, etc.—i.e. any systems that include a network of "pipes" for delivering one or more "materials" (these terms being given their broadest possible interpretations).

In one exemplary embodiment, the present invention provides a monitoring system for a conduit network including one or more conduit sections joined at one or more conduit nodes, including: one or more sensor devices disposed at selected ones of the one or more conduit nodes, wherein each of the one or more sensor devices is operable for sensing a blockage or breakage in an associated conduit section, and wherein each of the one or more sensor devices is operable for communicating blockage or breakage information to a central location. Preferably, each of the sensor devices includes one of an audio sensor device and a radio frequency sensor device and communicates via this medium. Each of the sensor devices is operable for sensing the blockage or breakage in the associated conduit section by measuring an attribute of a transmitted/received signal, alone or in combination with another sensor device. Each of the sensor devices is operable for communicating the blockage or breakage information to the central location via a wireless link. The monitoring system also includes a conduit network predictive model provided at the central location and operable for processing the blockage or breakage information to form a dynamic predictive maintenance policy that dictates a maintenance action. The monitoring system further includes a historical database that informs the conduit network predictive model. The monitoring system still further includes an alarm mechanism that is triggered at the central location by the blockage or breakage information if a predetermined blockage or breakage threshold is crossed. Optionally, the conduit network includes a sewer line network, the conduit sections include sewer line sections, and the conduit nodes include manholes.

In another exemplary embodiment, the present invention provides a monitoring method for a conduit network including one or more conduit sections joined at one or more conduit nodes, including: disposing one or more sensor devices at selected ones of the one or more conduit nodes, wherein each of the one or more sensor devices is operable for sensing a blockage or breakage in an associated conduit section, and wherein each of the one or more sensor devices is operable for communicating blockage or breakage information to a central location. Preferably, each of the sensor devices includes one of an audio sensor device and a radio frequency sensor device and communicates via this medium. Each of the sensor devices is operable for sensing the blockage or breakage in the associated conduit section by measuring an attribute of a transmitted/received signal, alone or in combination with another sensor device. Each of the sensor devices is operable for communicating the blockage or breakage information to the central location via a wireless link. The monitoring method also includes providing a conduit network predictive model at the central location operable for processing the blockage or breakage information to form a dynamic predictive maintenance policy that dictates a maintenance action. The monitoring method further includes providing a historical database that informs the conduit network predictive model. The monitoring method still further includes providing an alarm mechanism that is triggered at the central location by the blockage or breakage information if a predetermined blockage or breakage threshold is crossed. Optionally, the conduit network includes a sewer line network, the conduit sections include sewer line sections, and the conduit nodes include manholes.

In a further exemplary embodiment, the present invention provides a monitoring and maintenance method for a conduit network including one or more conduit sections joined at one or more conduit nodes, including: assessing a blockage or breakage state of each of the one or more conduit sections by measuring an attribute of an audio or radio frequency signal at each of the one or more conduit nodes; and maintaining each of the one or more conduit sections responsive to the assessed blockage or breakage state. Optionally, the blockage or breakage state is assessed at a central location. Optionally, the blockage or breakage state is assessed at the central location using a conduit network predictive model operable for processing blockage or breakage information to form a dynamic predictive maintenance policy that dictates a maintenance action. Optionally, the conduit network includes a sewer line network, the conduit sections include sewer line sections, and the conduit nodes include manholes.

BRIEF DESCRIPTION OF THE DRAWINGS

The present invention is illustrated and described herein with reference to the various drawings, in which like reference numbers are used to denote like system components/method steps, as appropriate, and in which.

DETAILED DESCRIPTION OF THE INVENTION

Figure 1:
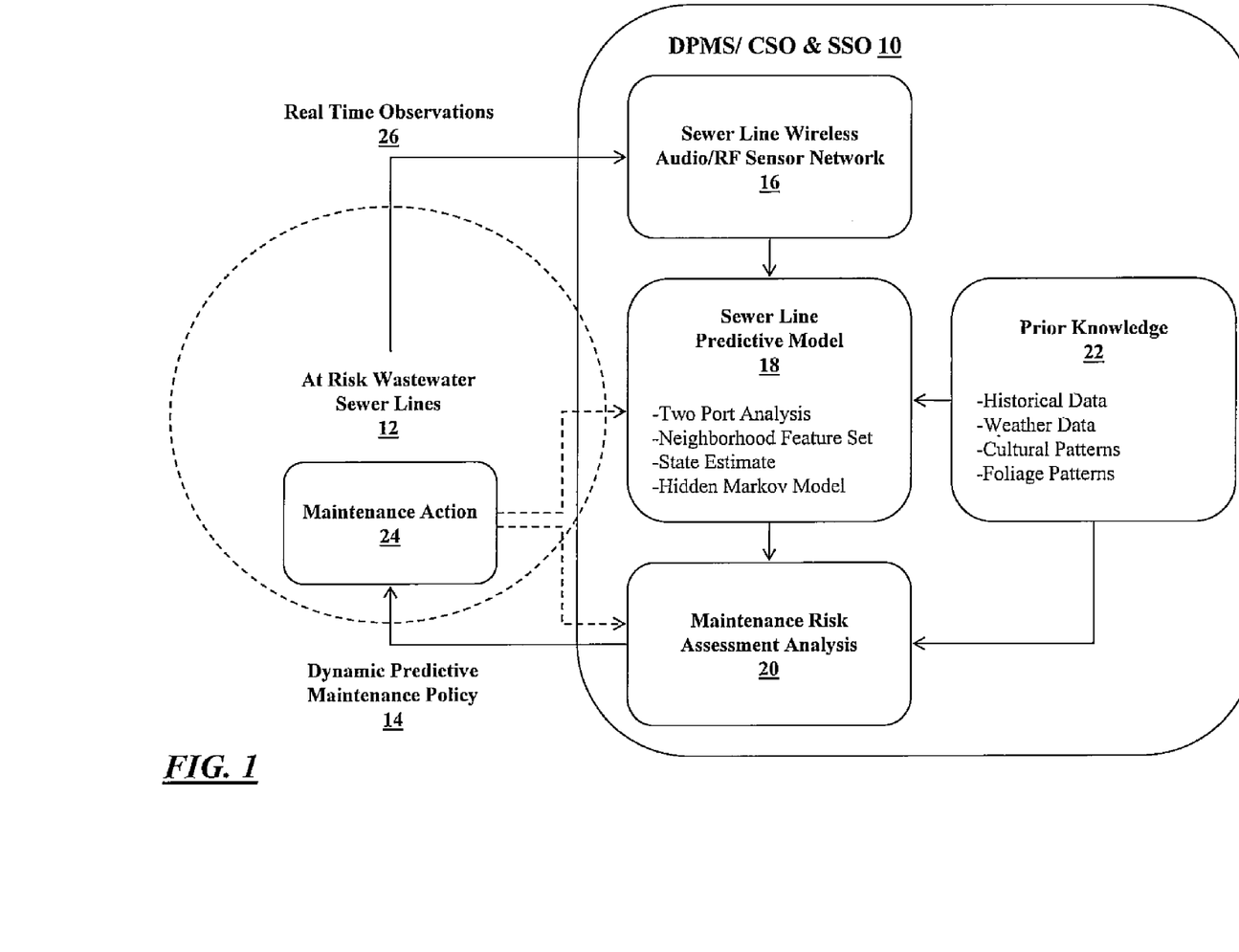
FIG. 1 is a schematic diagram illustrating one exemplary embodiment of the DPMS framework of the present invention.

Referring to FIG. 1, the DPMS 10 of the present invention utilizes real time observations of at risk wastewater sewer line sections 12 to formulate a dynamic predictive maintenance policy 14. This just-in-time dynamic predictive maintenance policy 14 minimizes the economic losses associated with conventional maintenance scheduling within at risk wastewater sewer line sections 12.

Conventional maintenance scheduling typically utilizes prior knowledge and informal risk assessment analysis to mitigate CSOs and SSOs. For example, it is known that wastewater sewer line sections that are located near restaurants and the like require regular maintenance due to improper grease handling practices.

As indicated by the random CSO and SSO distribution within many municipalities, using the current best practices in assessing at risk wastewater sewer line sections 12 is inadequate. Using historical data, weather data, cultural patterns, and foliage patterns, certain areas within a wastewater utilities network may be targeted as having a higher risk for CSOs and SSOs, but with no real insight into the specific wastewater sewer line sections at risk for overflowing. Likewise, trunk lines, which often run along secluded creeks or river basins, present a particularly high risk. Due to their remote location and high flow capacity, a blockage or breakage may result in a spill with a million or more gallons of wastewater overflowing prior to remediation. Using this insight, the commercial viability of the DPMS framework of the present invention is facilitated by limiting the deployment of DPMS real time observation technology to at risk wastewater sewer line sections 12 with a high risk for overflows or high cost if overflows occur.

High risk and a-periodic SSO wastewater sewer line sections are candidates for employing the DPMS framework of the present invention. As illustrated in FIG. 1, the DPMS 10 of the present invention deploys a SL-WASN 16 operable for performing real time observations. Likewise, an RF equivalent of the SL-WASN 16 may be deployed. The SL-WASN 16 is a key component for both monitoring the at risk wastewater sewer line sections 12, as well as providing communications technology to relay the real time observations back to a central office. The real time observations are then fed into a sewer line predictive model 18 that utilizes two port analysis, a neighborhood feature set, a state estimate, a hidden Markov model, and/or the like, which provides a maintenance risk assessment analysis 20. Both this sewer line predictive model 18 and maintenance risk assessment analysis 20 are informed by the prior knowledge 22 described above; including historical data, weather data, cultural patterns, foliage patterns, and/or the like. It should be noted that other factors may be taken into account for other, non-sewer line, applications. The maintenance risk assessment analysis 20 is used to formulate the dynamic predictive maintenance policy 14 and take a maintenance action 24, information regarding which is fed back into the sewer line predictive model 18 and maintenance risk assessment analysis 20. As described above, real time observations 26 are used to inform the placement and operation of the SL-WASN 16.

Each of the components of the DPMS 10 is described in greater detail herein below. The DPMS 10 is based on deploying the SL-WASN 16 in order to enable and implement the DPMS framework. The components of the DPMS 10 interrelate to each other to form a turn-key solution for wastewater utilities to maintain at risk sewer lines sections 12, or for other entities to maintain other conduit network sections in a like manner. In this respect, the DPMS 10 of the present invention is very adaptable and robust.

The maintenance risk assessment analysis 20 is carried out in real time for the portion of the wastewater utility's network covered by the DPMS 10. This evaluation is based on data relayed to the central office from the SL-WASN 16. The data provided by the SL-WASN 16 is a feature set characterizing the blockage for each section of pipe, i.e. the blockage estimation feature set. Using the blockage estimation feature set, state estimations for the blockage are made. The specific composition of the blockage estimation feature set is application specific. The complexity of and implementation requirements for the maintenance risk assessment analysis 20 are based on the characteristics of the blockage estimation feature set and the noise processes associated with measuring the data. These factors influence the ability to discriminate between the various blockage states, i.e. the degree to which a section of pipe is blocked or broken.

A classical Bayesian risk assessment analysis is used to illustrate the maintenance risk assessment analysis 20, where the optimal maintenance action is based on minimizing the following conditional risk over the set of all possible actions:

$$R(\alpha_i \mid x) = \sum_{j=1}^{\#States} \lambda(\alpha_i \mid \omega_j) Pr[\omega_j \mid x] \qquad (1)$$

where:
$\alpha_i$ is the $i^{th}$ maintenance action, e.g. clean the at risk sewer line section 12 within the next month.
$\omega_j$ is the $j^{th}$ blockage state within the at risk sewer line section, e.g. the at risk sewer line section 12 is 25% blocked.
$Pr[\omega_j|x]$ is the likelihood of state $\omega_j$ given the observation x, $\omega_j$ is the true blockage state and x is the observation from which the true blockage state is to be inferred.
$\lambda(\alpha_i|\omega_j)$ is a weighting function representing the loss associated with taking maintenance action $\alpha_i$ given blockage state $\omega_j$, e.g. the loss associated with waiting a month to perform maintenance given that the at risk sewer line section 12 is currently 25% blocked.

This Bayesian risk assessment is only one possible approach, and is provided here by way of non-limiting example. Due to the temporal characteristics of the blockage, it is possible that using a Markov model or a hidden Markov model, well known to those of ordinary skill in the art, may enhance the reliability of the maintenance risk assessment analysis.

Real time observations of the at risk sewer line sections 12 provide measured parameters for estimating the state of blockage present. These real time observations are relayed to the central office, allowing the dynamic predictive maintenance policy 14 to be adapted. The SL-WASN 16 of the present invention incorporates two fundamental and novel technical innovations: 1) it directly detects blockage/breakage characteristics and 2) it utilizes a wireless communication network deployed in the conduit network. These two fundamental and novel technical innovations provide significant advantages over current CSO and SSO detection technologies, where detection is indirectly assessed. For example, flow rates are currently measured at disparate locations within the conduit network and/or radar is used to study blockages/breakages locally. In the former case, each flow meter's measurement is relayed directly through an existing above ground cellular network to the central office. At the central office, the flow meter data, in conjunction with wastewater network flow models, are used to assess blockages within the entire conduit network. Depending on the number of flow meters, this approach may be useful for detecting problems within the largest diameter pipes. Conventional technologies, however, suffer from their inability to detect problems within feeder lines, were most overflows occur. Due to the high cost associated with both the flow meters, as well as the initial and recurring service costs for each cellular modem, expanding the number of flow meters deployed is prohibitive. Even with an expanded number of flow meters, this approach has the inherent limitation of indirect measurement, which limits the early detection of blockages.

Figure 2:
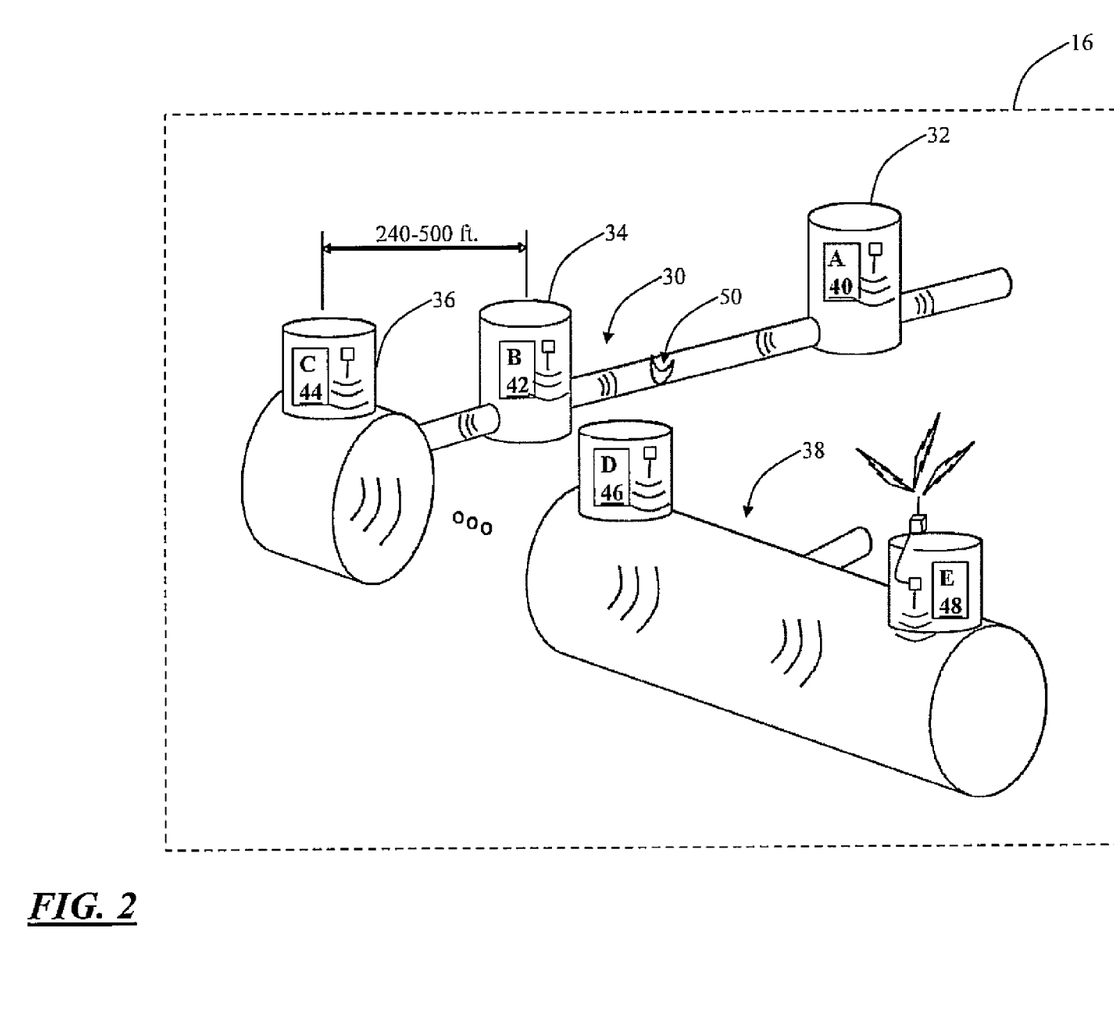
FIG. 2 is a schematic diagram illustrating one exemplary embodiment of the sewer line wireless audio sensor network (SL-WASN) of the present invention (which is conceptually similar to the sewer line wireless RF sensor network of the present invention)
Figure 9:
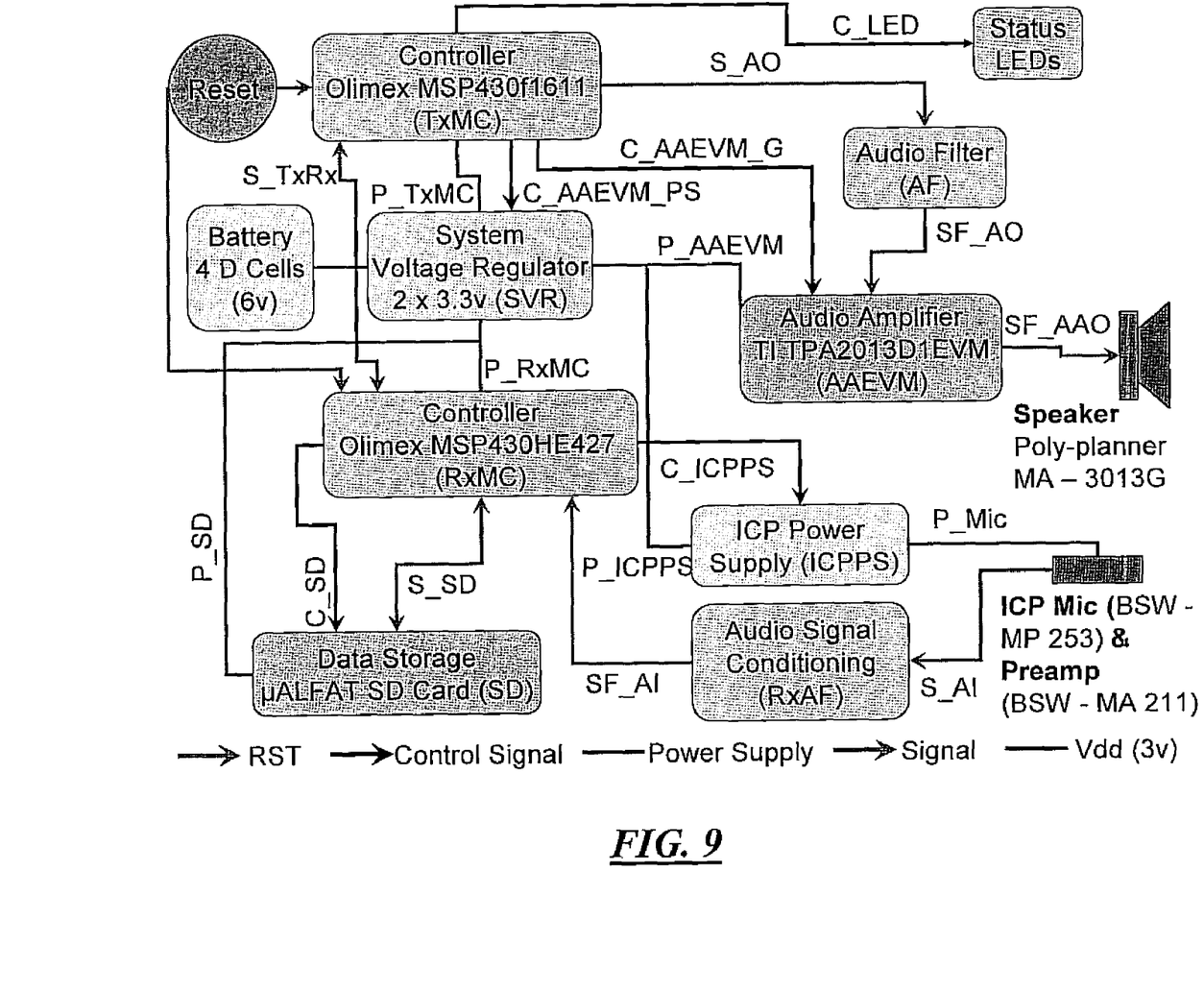
FIG. 9 is a schematic diagram illustrating one exemplary embodiment of an audio sensor node of the present invention, highlighting the components thereof.

Referring to FIG. 2, sewer line section ABC 30 is a typical feeder line with an 8-inch diameter pipe with manhole A 32, manhole B 34, and manhole C 36 located at 240-500-foot spacing. Sewer line section ABC 30 feeds into trunk line section CDE 38. This exemplary region of the sewer network has a high risk for overflows. Thus, at regular intervals within the sewer network, low cost wireless audio or RF sensors/transceivers (i.e. sensor node A 40, sensor node B 42, sensor node C 44, sensor node D 46, and sensor node E 48) are deployed within the respective manholes. In the audio case, each of these sensor nodes includes readily available, off-the-shelf components, as illustrated in an exemplary embodiment in FIG. 9. The sensor nodes are collectively operable for exchanging audio signals that are predictably impacted or affected by intervening blockages/breakages. In the RF case, each of these sensor nodes also includes readily available, off-the-shelf components. The sensor nodes are collectively operable for exchanging RF signals that are predictably impacted or affected by intervening blockages/breakages. The sensor nodes self configure into a sensor network, allowing sensor data from each of the sensor nodes to be relayed through the sensor network to a collection point, i.e. sensor node E 48 in the example illustrated. This collection point provides a gateway for the SL-WASN 16 to the cellular network through which blockage/breakage estimates within each section of the sewer network covered by the sensor network is relayed back to the central office. The topology of the sensor network may be configured to best support sewer overflow detection within the wastewater utilities district. Multiple sensor networks may be installed within different regions of the sewer network in order to directly monitor all of the at risk sewer line sections 12 (FIG. 1). Again, other conduit networks may be configured similarly to the sewer network illustrated.

By measuring both the transmission and reflection of the audio/RF signals between the sensor nodes, a sewer line section blockage/breakage 50 may be directly assessed. Both the transmission and reflection characteristic of the sound waves/RF signals will be impacted based on grease build up, root blockage, or other obstructions, as well as a breakage. This is illustrated between node A 40 and node B 42 where sewer line section ABC 30 is obstructed by a partial blockage 50. The basic signal measurements for detecting a blockage/breakage 50 include: 1) measuring the transmission and reflection characteristics of the audio/RF signals between the sensor nodes, 2) measuring only the transmission characteristics of the audio/RF signals between the sensor nodes, 3) measuring only the reflection characteristics of the audio/RF signals between the sensor nodes, and 4) in the audio case, passively detecting ambient sound waves. For example, the second and fourth measurements may be used in conjunction with one another. Different signal attributes may be used in evaluating a blockage/breakage 50 based on these measurements, such as, for example: 1) signal attenuation—the least complex to estimate and likely sufficient—based on the transmission between two nodes and 2) impulse response—FIG. 4—a more complete method.

Optionally, the same audio technology used for detecting the condition of the at risk sewer line sections 12 (FIG. 1) may also be used for wireless communications. Audio communications are typically limited to underwater applications or wireline computer modem data communications. Seldom (if ever) have audio communications been used for wireless sensor network applications due to the limited propagation range of sound waves in free space. For the conduit network applications of the present invention, the pipes act as waveguides, making audio communications a viable choice.

In the RF case, a lump parameter model may be used to estimate the propagation characteristics based on the empirical measurements:

$$P_R(d) = P_t - \alpha_{(a,\sigma)} \times d - A_{CL} \quad (2)$$

where the power received at distance d, $P_R(d)$, and the transmit power, $P_t$, are in dBm. The multimodal attenuation $\alpha$ in dB/m is dependent upon the conductivity, $\sigma$, and waveguide radius, a. The antenna coupling loss $A_{CL}$ is in dB. Results from a measurement campaign conducted in the 2.4 GHz band, for example, are summarized in Table 2.

TABLE 2

Measurement Campaign Conducted in the 2.4 GHz Band

| Pipe Diameter (m) | Antenna Coupling Loss, $A_{cl}$ (dB) | Attenuation, $\alpha$ (dB/m) |
| --- | --- | --- |
| 0.30 | 22.93 | 4.80 |
| 0.76 | 41.56 | 0.74 |
| 1.07 | 44.83 | 0.78 |
| 1.37 | 43.39 | 0.76 |

The challenge with using RF signals for the SL-WASN application is illustrated by the results of Table 2. For reliable communications with off-the-shelf RF transceivers operating in the 2.4 GHz band $[P_t - P_R(d)]_{max} \approx 120$ dB. Therefore, for a 1-foot pipe (0.3 m) $d_{max} \approx 66$ feet (20 m) and for a 4.5-foot pipe (1.37 m) $d_{max} \approx 330$ feet (100 m), the estimated maximum distance is considerably less than the desired maximum distance required for the SL-WASN application. Based both in theory and in empirical measurements, as the diameter of the pipe decreases, the number of modes supported also decreases, resulting in higher signal attenuation. By using an RF signal at a higher frequency, the attenuation may be decreased, but with an increase in implementation cost. This increase may be acceptable in some applications, and the use of an RF-based system may not be discounted.

Audio wave propagation in pipes is a classic topic with a significant body of theory and research. Sewer pipes and similar conduits are natural audio waveguides. Basic theory on audio propagation based on laboratory measurements of acoustic absorptions in fluids contained within cylindrical pipes indicates the following relationship between the pressure amplitude P(•) at distance $d_2$ as compared with the pressure amplitude P(•) at distance $d_1$:

$$P(d_2) = P(d_1) e^{-\alpha(d_2 - d_1)} \quad (3)$$

where $\alpha$ is the audio attenuation coefficient. For fluids contained within pipes, the attenuation coefficients needs to account for the viscous resistance offered at the pipe walls. Fluid flow within the pipe incurs a phase difference between the fluid particle velocity and the acoustic pressure due to the pipe walls. The phase difference results in the presence of acoustic dispersion in addition to the attenuation. Acoustic attenuation in pipes can be well modeled by:

$$\alpha = \frac{1}{ac} \sqrt{\frac{\eta_e \omega}{2\rho}} \quad (4)$$

where a is the radius of the pipe, c is the speed of sound, $\eta_e$ is the modified coefficient of viscosity, $\omega$ is the audio signal frequency, and $\rho$ is the density of the fluid. The modified coefficient of viscosity, $\eta_e$, incorporates the effect of thermal conduction at the pipe walls:

$$\eta_e = \eta \left[ 1 + \left( \frac{\gamma + 1}{\sqrt{\gamma}} \right) \sqrt{\frac{\kappa}{c_p \eta}} \right]^2 \quad (5)$$

where $\gamma$ is the ratio of the specific heats, $\kappa$ is the thermal conductivity, and $c_p$ is the specific heat at constant pressure. Using typical values for the constants, the audio attenuation coefficient is evaluated for an 8-inch PVC pipe in FIG. 3. Initial audio propagation data was collected within an inactive sewer line section based on first generation measurement equipment that employed a 0.5-watt audio signal at the transmitter and a sound pressure meter as the receiver with frequency band coverage from 20 Hz to 20 kHz. The preliminary estimate for the audio attenuation coefficient based on the measured data is also given in FIG. 3. As expected, the empirical estimated coefficient is higher than the analytical estimated coefficient.

Figure 3:
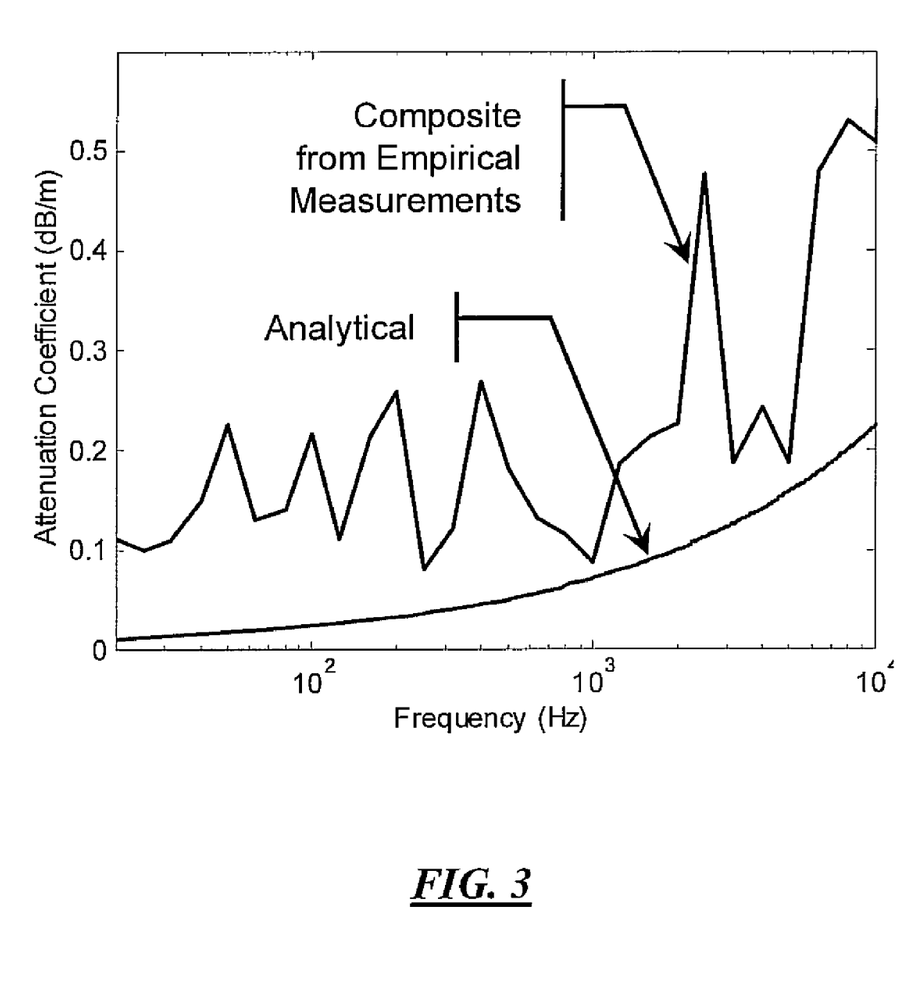
FIG. 3 is a plot illustrating the evaluation of an audio attenuation coefficient for an 8-inch polyvinylchloride (PVC) pipe.

The feasibility of using audio signals for the SL-WASN application is motivated by the results of FIG. 3. For reliable communications with off-the-shelf audio hardware, $[P(d_1) - P(d_2)]_{max} \approx 90$ dB. For a typical 8-inch sewer line feeder pipe, based on the empirical estimate for the audio attenuation coefficient, $d_{max} \approx 3475$ feet (1059 m) at 600 Hz and $d_{max} \approx 769$ feet (234 m) at 10 kHz. The estimated maximum distance is considerably greater than the desired maximum distance of 500 feet required for the SL-WASN application. Also, the audio attenuation coefficient is inversely proportional to the pipe radius; therefore, for larger diameter pipes, the attenuation coefficient decreases proportionally, suggesting greater maximum transmission ranges.

Ultrasound waves have long been used for imaging and audio wave imaging is used for determining room acoustics for sound reproduction systems. For the SL-WASN application of the present invention, a similar approach is used based on assuming that over a sufficiently short time interval each sewer line section may be viewed as a linear time invariant (LTI) system. Because of the dynamics of the flow and the variation in the flow level, the sewer line impulse response, h(t), is statistically invariant over a limited time interval. This limited time interval is the coherence time for the sewer line section and is one of the parameters of the present invention.

Figure 4:
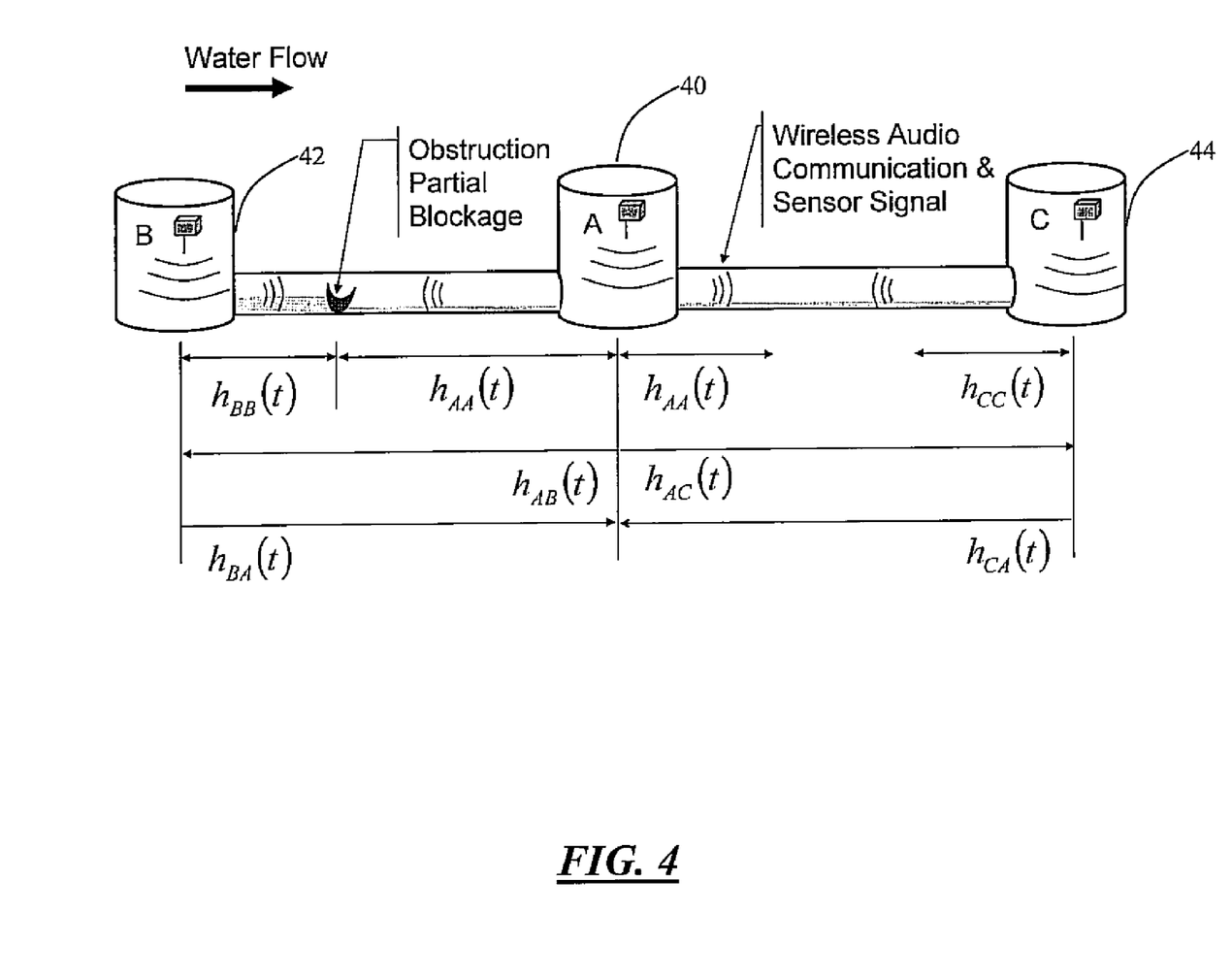
FIG. 4 is a schematic diagram illustrating one exemplary embodiment of a measurement process used by the SL-WASN of FIG. 2 to obtain a blockage estimation feature set used to classify a blockage state of an at risk sewer line section.

FIG. 4 illustrates a possible measurement process used by the SL-WASN 16 (FIGS. 1 and 2) of the present invention to obtain the blockage estimation feature set used to classify the blockage state. Sensor nodes 40,42,44 are located at regular distances inside the manholes. These sensor nodes 40,42,44 periodically estimate the impulse response associated with their reflection, e.g. $h_{AA}(t)$, as well as the impulse response associated with the transmission from their neighboring sensor nodes, e.g. $h_{BA}(t)$ and $h_{CA}(t)$. Each sensor node 40,42,44 in the neighborhood sequentially transmits and thereby provides an approximate two port analysis for each sewer line section.

Figure 5:
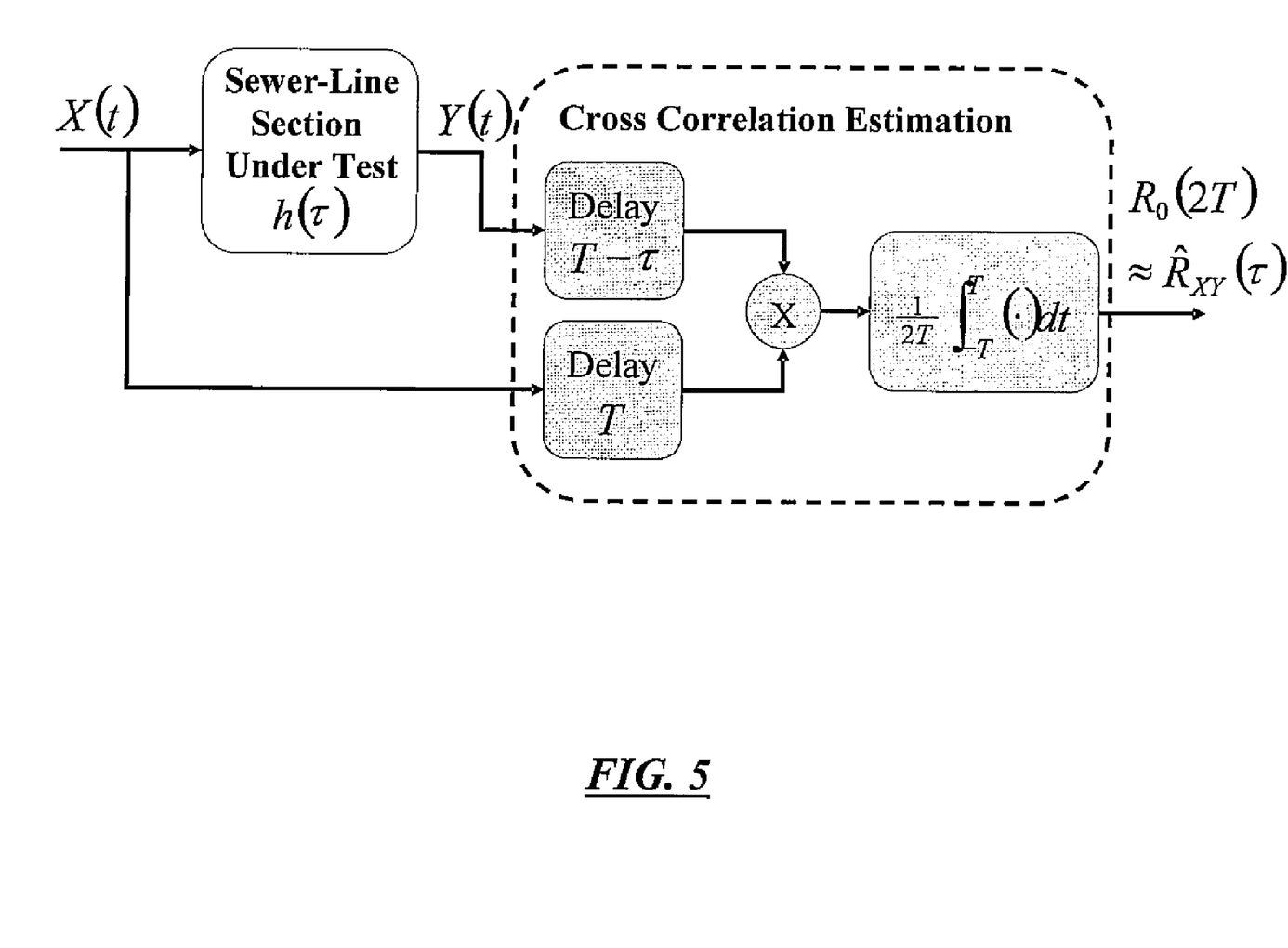
FIG. 5 is a schematic diagram illustrating one exemplary method for estimating an impulse response associated with the measurement process of FIG. 4.

The impulse response may be estimated using several different approaches. One of the more promising exemplary approaches is illustrated in FIG. 5, where the signal transmitted at the source, X(t), is a maximum length sequence (MLS). MLSs have an approximate constant power spectral density and an auto correlation of $R_{XX}(\tau) \approx N_o/2\delta(\tau)$. The impulse response of the sewer line section under test, i.e. the sewer line section between the source and the receiver, is:

$$h(\tau) \approx \hat{R}_{XY}(\tau) \approx \frac{1}{2\pi} \int_{-T}^{T} x(t) y(t+\tau) \, dt \qquad (6)$$

given that T is sufficiently large and the impulse response is stationary over the interval 2T.

Referring again to FIG. 4, blockage within the pipe affects the impulse response, e.g. $h_{BB}(t)$, $h_{AA}(t)$, $h_{AB}(t)$, $h_{BA}(t)$. The impact on the impulse response is due to the blockage, but also due to the change in the water levels from upstream of the blockage versus downstream. It should be noted that the variation in the upstream and downstream impulse responses is also impacted by the blockage in sewer line section AB.

The blockage estimation feature set based on the two port impulse response analysis provides a significant degree of redundancy that improves the detection reliability, but at the relatively small cost of increased computational complexity. An alternative approach is to evaluate the transmission sound pressure level (SPL) within several frequency bands, rather than evaluate the impulse response. Evaluating tradeoffs associated with different blockage estimation feature sets in order to develop a robust and computationally cost effective feature set is a primary aspect of the present invention that involves testing to evaluate different blockage conditions under different flow rates and water levels.

Flow rates and flow levels fluctuate throughout the day within a sewer line section, and may fluctuate over different time periods in other conduit systems. Therefore, based on the relative size of the blockage to the sewer line water level, the blockage may be obscured by the water. On the positive side, grease blockages tend to build slowly over time, so statistics may be collected over days to observe potential changes in the blockage characteristics. One of the challenges in developing the SL-WASN 16 (FIGS. 1 and 2) is scheduling the sewer line acoustic or RF sensing at a sufficiently high occurrence rate, while minimizing the occurrence in order to conserve limited battery power. For the SL-WASN 16 to be economically viable, the sensor nodes should operate for at least one year in a sewer line application, i.e. the frequency at which the Environmental Protection Agency (EPA) requires each manhole entrance to be inspected. An additional aspect of the present invention is to obtain estimates of daily and weekly fluctuations in the blockage estimation feature set based on long term field trial deployments. These are used to develop acoustic or RF sensing scheduling and an optimized scheduling algorithm.

Figure 6:
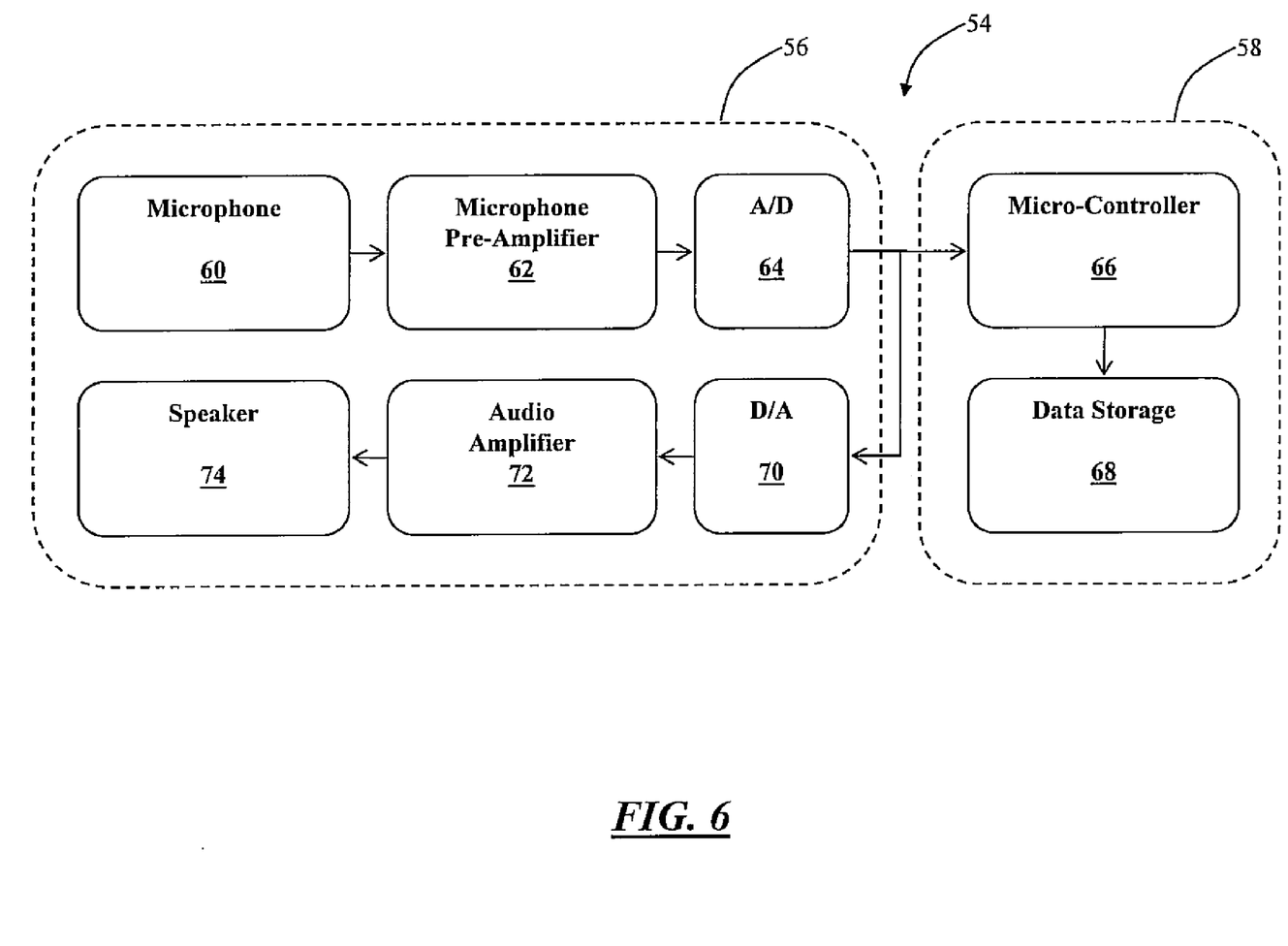
FIG. 6 is a schematic diagram illustrating one exemplary embodiment of an acoustic sensor node of the SL-WASN of FIG. 2.

Referring to FIG. 6, in one exemplary embodiment, an acoustic sensor node 54 of the SL-WASN 16 (FIGS. 1 and 2) includes a first component assembly 56 and a second component assembly 58 that are electrically coupled. Optionally, the first component assembly 56 and the second component assembly 58 are integrally formed. The first component assembly 56 includes a microphone 60, a microphone pre-amplifier 62, and analog/digital (A/D) converter 64, a digital/analog (D/A) converter 70, an audio amplifier 72, and a speaker 74. The A/D converter 64 and D/A converter 70 are electrically coupled to a micro-controller 66 and associated data storage 68 of the second component assembly 58. Optionally, the microphone and speaker subsystem is designed and fabricated based on off-the-shelf audio components. The microcontroller and data storage subsystem may be purchased as a development board in order to reduce development time and expense. Current technology is available for integrating a cellular modem into an embedded system; and the present invention addresses the challenges associated with receiving a cellular RF signal inside a manhole entrance or with locating a cellular antenna outside the manhole entrance.

Based on a preliminary evaluation of sewer line propagation characteristics, an upper bound on the operational frequency may be 20 kHz. This corresponds well to the consumer audio market for cellular and MP3 devices, and home theater systems. Therefore, the cost of audio components is based on existing markets with a large economy of scale. In addition, many of the consumer products have similar battery constraints and, therefore, have built in power safe modes pre-established in their integrated circuit (IC) designs.

The central design challenge of the present invention involves the transducers; both microphone and speaker. Due to the potential of exposure to the water flow and the chemicals from industrial wastes, the microphone and speaker must be capable of operating in a harsh environment. For example, microphones and speakers that are designed for rugged environments, with the ability to operate after submersion in 15 m of water in addition to being corrosion resistant, may be used.

Using the sewer line network as a communication channel presents a number of issues: thermal variations, pipe bends, manhole entrances, variation in pipe surfaces, variation in water flow rates and levels, surface noise (cars, trucks, etc.), water flow noise, and other in-sewer noise sources (e.g., animals and insects). The audio communication physical layer (PHY) must adapt to the current communication channel conditions in order to maximize the channel capacity with a sufficiently low transmission error rate. A distinct advantage for the SL-WASN 16 (FIGS. 1 and 2)—the audio signal serves the dual purpose of acoustic sensing and communication. The results of the acoustic sensing may be used to adapt the PHY layer signal processing parameters, e.g. channel equalizer and transmission power. The only restriction is that the communication transmission must occur within the sewer line coherence time of the acoustic sensing. Upper layers of the protocol are developed based on adapting the significant body of work from energy efficient wireless sensor networks.

Figure 7:
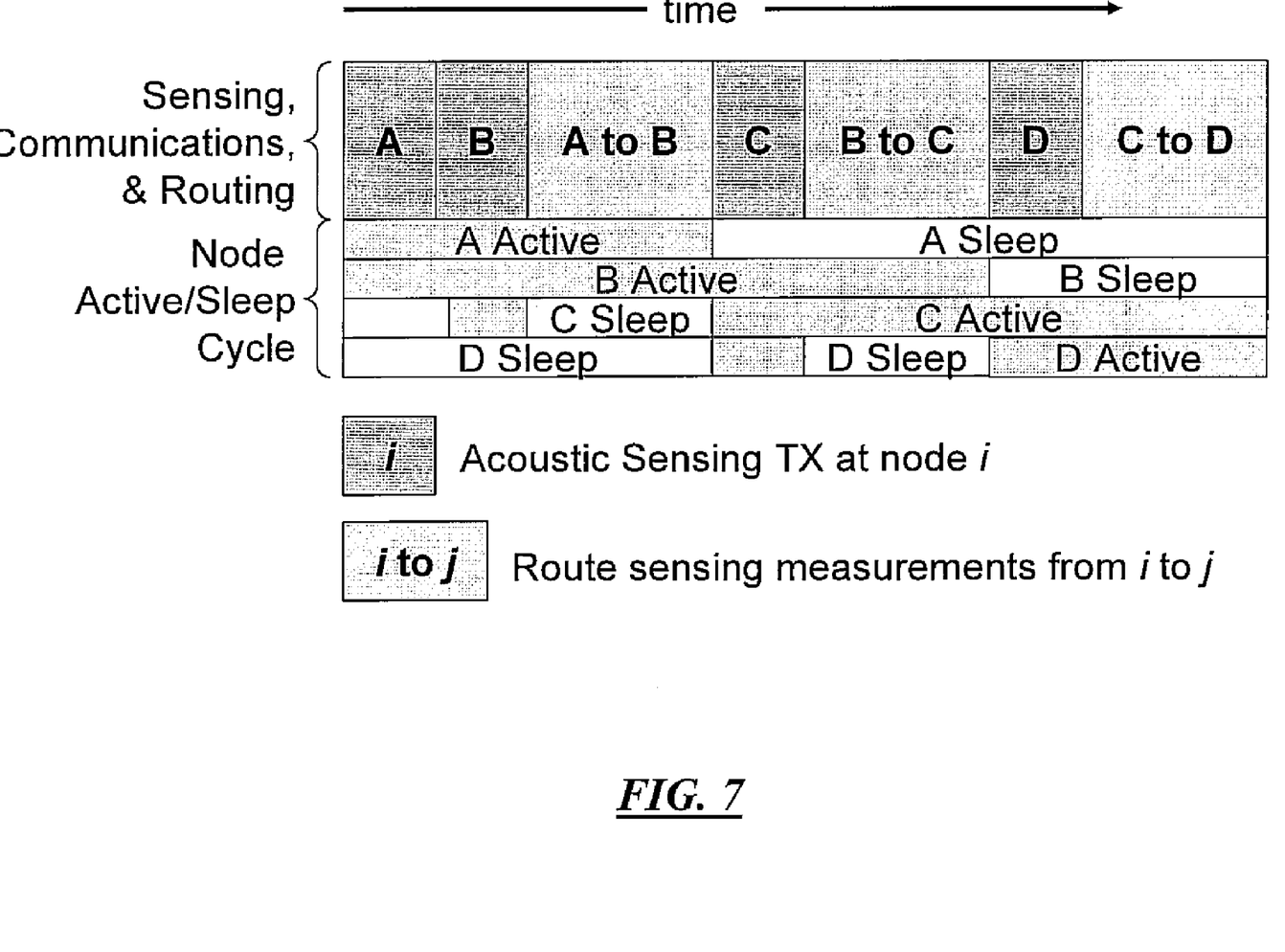
FIG. 7 is a schematic diagram illustrating one exemplary embodiment of a SL-WASN protocol of the present invention, where blockage data is communicated from sensor node A-B-C-D.

FIG. 7 illustrates one exemplary implementation of the SL-WASN protocol of the present invention, where blockage data is communicated from sensor node A-B-C-D. Transmissions are packet based with error detection and acknowledgement. The MAC layer is based on a combined time division multiple access (TDMA) and collision sense multiple access with collision avoidance (CSMA/CA). Each sensor node is allocated a transmission window in which to successfully transmit; therefore, no other sensor nodes cause interference to its transmission at the intended receiving node. CSMA/CA is used to minimize the impact of co-channel noise sources. Therefore, prior to transmitting, a sensor node listens to the channel for noise sources and back-off to avoid transmitting during their presence. The back-off algorithm and the communication window length are based on the characteristics of the noise sources present in the sewer-line. The communication window length is set to allow for multiple retransmissions to ensure a reliable communication link. Time synchronization between sensor nodes is achieved through the acoustic sensing transmission. The sensor nodes operate on a very low duty cycle and for a large percentage of the time are in a power down mode.

Figure 8:
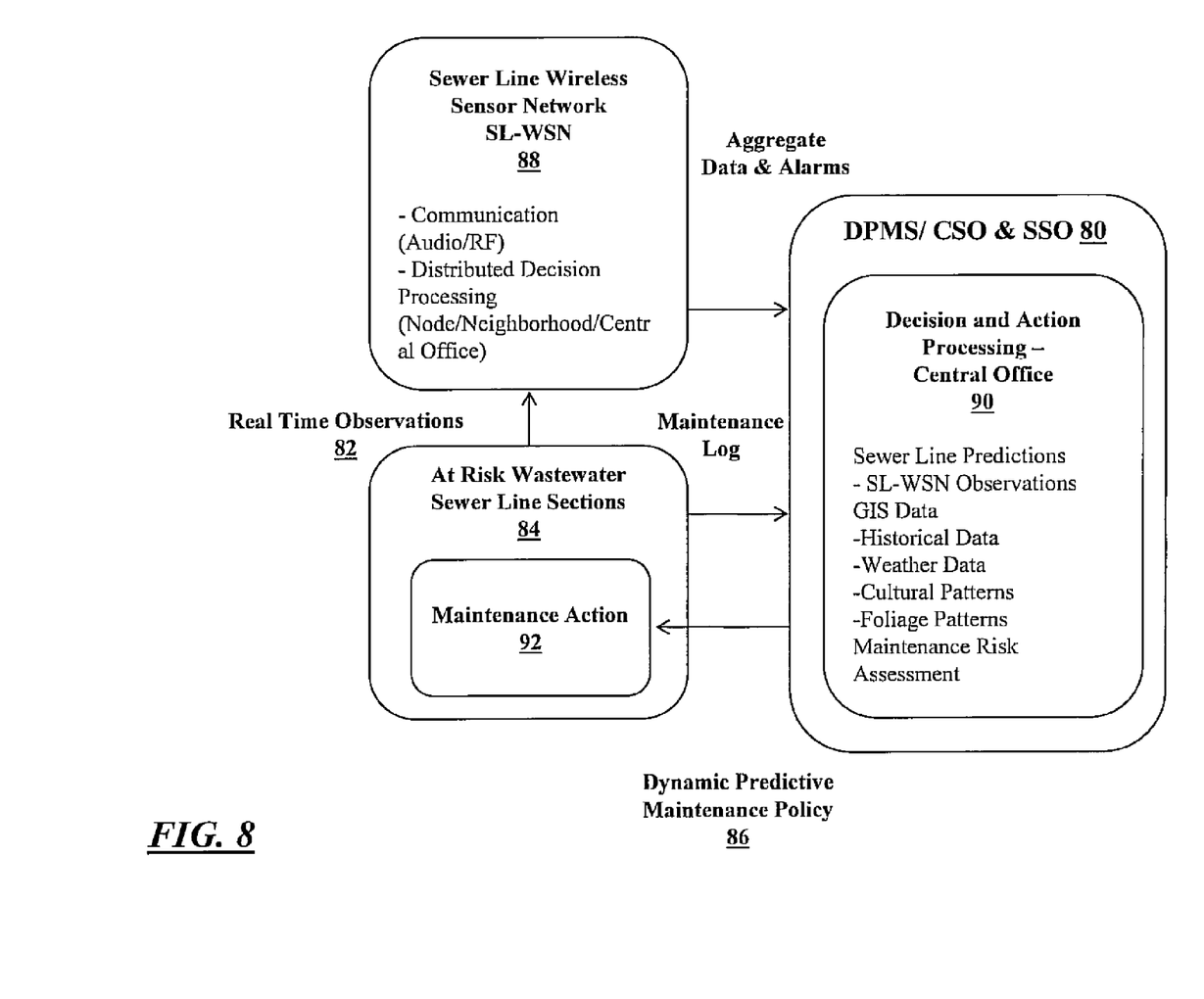
FIG. 8 is a schematic diagram illustrating another, more generic, exemplary embodiment of the DPMS framework of the present invention.

Referring to FIG. 8, in another, more generic, exemplary embodiment that summarizes the systems/methods described above, the DPMS 80 of the present invention utilizes real time observations 82 of at risk wastewater sewer line sections 84 to formulate a dynamic predictive maintenance policy 86. This just-in-time dynamic predictive maintenance policy 86 minimizes the economic losses associated with conventional maintenance scheduling within at risk wastewater sewer line sections 84. High risk and a-periodic SSO wastewater sewer line sections are candidates for employing the DPMS framework of the present invention. As illustrated in FIG. 8, the DPMS 80 of the present invention deploys a sewer line wireless sensor network (SL-WSN) 88 operable for performing real time observations. This SL-WSN 88 may be audio based, RF based, or based on an equivalent medium/technology. The SL-WSN 88 is a key component for both monitoring the at risk wastewater sewer line sections 84, as well as providing communications technology to relay the real time observations 82 back to the central office. The real time observations 82 are then fed into a sewer line predictive model that utilizes two port analysis, a neighborhood feature set, a state estimate, a hidden Markov model, and/or the like, which provide decision and action processing 90 at the central office. Both this sewer line predictive model and maintenance risk assessment analysis are informed by the prior knowledge described above; including historical data, weather data, cultural patterns, foliage patterns, and/or the like. It should be noted that other factors may be taken into account for other, non-sewer line, applications. The maintenance risk assessment analysis is used to formulate the dynamic predictive maintenance policy 86 and take a maintenance action 92, information regarding which is fed back into the sewer line predictive model and maintenance risk assessment analysis. As described above, real time observations 82 are used to inform the placement and operation of the SL-WSN 88.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A monitoring system for a conduit network comprising one or more conduit sections joined at one or more conduit nodes, comprising:
one or more sensor devices disposed at selected ones of the one or more conduit nodes, wherein each of the one or more sensor devices is operable for sensing a blockage or breakage in an associated conduit section by one or more of transmitting a signal that is affected by the blockage or breakage to another sensor device that measures a transmitted signal after it has passed through or by the blockage or breakage and transmitting a signal that is reflected by the blockage or breakage back to itself with both the transmitted signal after it has passed through or by the blockage or breakage and a reflected signal after it has been reflected by the blockage or breakage being measured, wherein the signal is transmitted in a direction that is substantially parallel to an intended fluid flow direction in the associated conduit section, and wherein each of the one or more sensor devices is operable for communicating blockage or breakage information to a central location.

2. The monitoring system of claim 1, wherein each of the sensor devices comprises one of an audio sensor device and a radio frequency sensor device.

3. The monitoring system of claim 1, wherein each of the sensor devices is operable for sensing the blockage or breakage in the associated conduit section by measuring an attribute of a transmitted/received signal, alone or in combination with another sensor device.

4. The monitoring system of claim 1, wherein each of the sensor devices is operable for communicating the blockage or breakage information to the central location via a wireless link.

5. The monitoring system of claim 1, further comprising a conduit network predictive model provided at the central location and operable for processing the blockage or breakage information to form a dynamic predictive maintenance policy that dictates a maintenance action.

6. The monitoring system of claim 5, further comprising a historical database that informs the conduit network predictive model.

7. The monitoring system of claim 1, further comprising an alarm mechanism that is triggered at the central location by the blockage or breakage information if a predetermined blockage or breakage threshold is crossed.

8. The monitoring system of claim 1, wherein the conduit network comprises a sewer line network, the conduit sections comprise sewer line sections, and the conduit nodes comprise manholes.

9. A monitoring method for a conduit network comprising one or more conduit sections joined at one or more conduit nodes, comprising:
disposing one or more sensor devices at selected ones of the one or more conduit nodes, wherein each of the one or more sensor devices is operable for sensing a blockage or breakage in an associated conduit section by one or more of transmitting a signal that is affected by the blockage or breakage to another sensor device that measures a transmitted signal after it has passed through or by the blockage or breakage and transmitting a signal that is reflected by the blockage or breakage back to itself with both the transmitted signal after it has passed through or by the blockage or breakage and a reflected signal after it has been reflected by the blockage or breakage being measured, wherein the signal is transmitted in a direction that is substantially parallel to an intended fluid flow direction in the associated conduit section, and wherein each of the one or more sensor devices is operable for communicating blockage or breakage information to a central location.

10. The monitoring method of claim 9, wherein each of the sensor devices comprises one of an audio sensor device and a radio frequency sensor device.

11. The monitoring method of claim 9, wherein each of the sensor devices is operable for sensing the blockage or breakage in the associated conduit section by measuring an attribute of a transmitted/received signal, alone or in combination with another sensor device.

12. The monitoring method of claim 9, wherein each of the sensor devices is operable for communicating the blockage or breakage information to the central location via a wireless link.

13. The monitoring method of claim 9, further comprising providing a conduit network predictive model at the central location operable for processing the blockage or breakage information to form a dynamic predictive maintenance policy that dictates a maintenance action.

14. The monitoring method of claim 13, further comprising providing a historical database that informs the conduit network predictive model.

15. The monitoring method of claim 9, further comprising providing an alarm mechanism that is triggered at the central location by the blockage or breakage information if a predetermined blockage or breakage threshold is crossed.

16. The monitoring method of claim 9, wherein the conduit network comprises a sewer line network, the conduit sections comprise sewer line sections, and the conduit nodes comprise manholes.

17. A monitoring and maintenance method for a conduit network comprising one or more conduit sections joined at one or more conduit nodes, comprising:
  assessing a blockage or breakage state of each of the one or more conduit sections by measuring an attribute of a transmitted audio or radio frequency signal after it has passed through or by a blockage or breakage at each of the one or more conduit nodes, wherein the transmitted audio or radio frequency signal is transmitted in a direction that is substantially parallel to an intended fluid flow direction in each of the one or more conduit sections; and
  maintaining each of the one or more conduit sections responsive to the assessed blockage or breakage state.

18. The monitoring and maintenance method of claim 17, wherein the blockage or breakage state is assessed at a central location.

19. The monitoring and maintenance method of claim 18, wherein the blockage or breakage state is assessed at the central location using a conduit network predictive model operable for processing blockage or breakage information to form a dynamic predictive maintenance policy that dictates a maintenance action.

20. The monitoring and maintenance method of claim 17, wherein the conduit network comprises a sewer line network, the conduit sections comprise sewer line sections, and the conduit nodes comprise manholes.

* * * * *